(No Model.)  
6 Sheets—Sheet 1.

G. T. BOOTH.
DISK HARROW.

No. 405,005.  
Patented June 11, 1889.

WITNESSES:  
Fred G. Dieterich  
P. B. Turpin

INVENTOR:  
George Thomas Booth  
BY  
Munn & Co  
ATTORNEYS.

(No Model.) 6 Sheets—Sheet 4.
G. T. BOOTH.
DISK HARROW.

No. 405,005. Patented June 11, 1889.

WITNESSES:
Fred G. Dieterich
P. B. Turpin

INVENTOR:
George Thomas Booth
BY Munn & Co
ATTORNEYS.

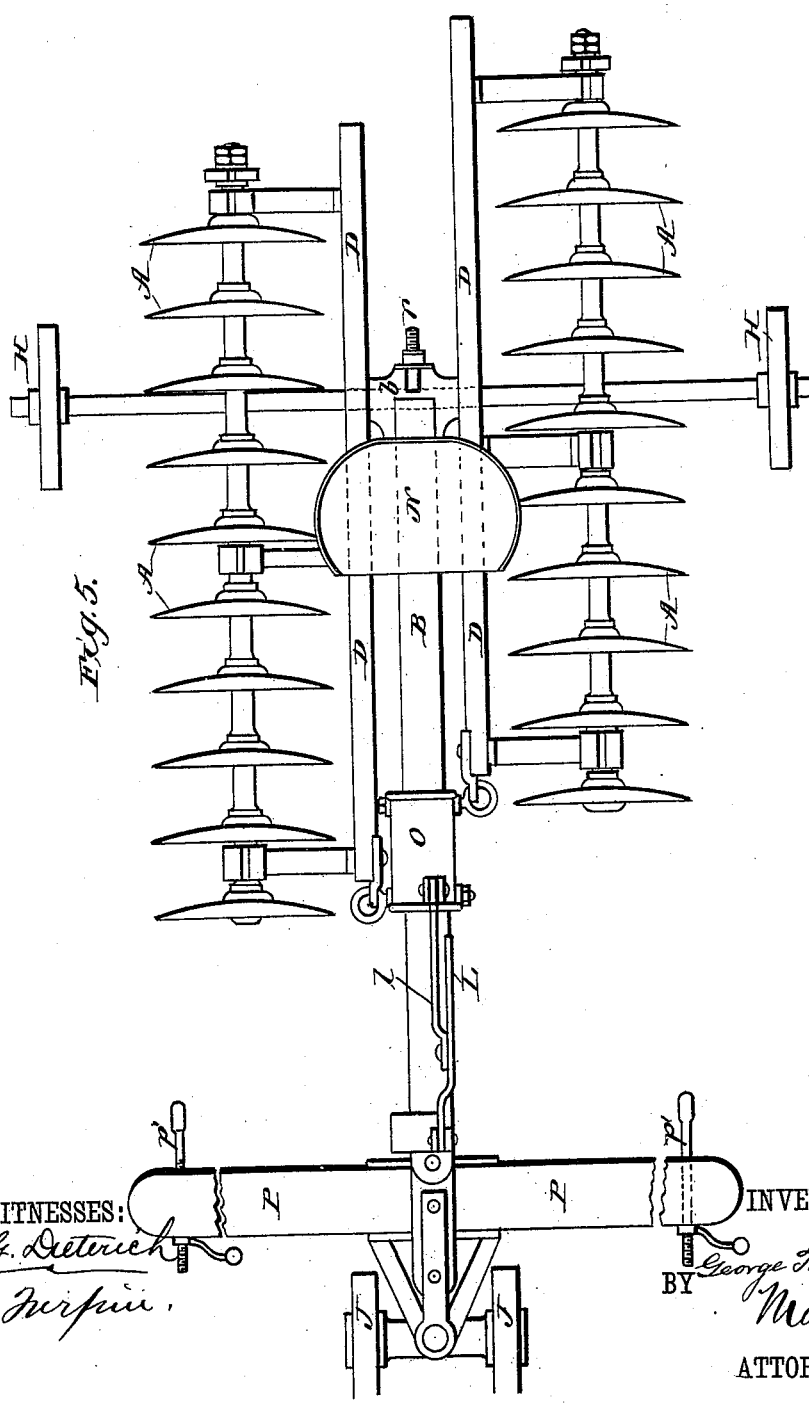

(No Model.)  
6 Sheets—Sheet 6.
G. T. BOOTH.
DISK HARROW.
No. 405,005.  Patented June 11, 1889.
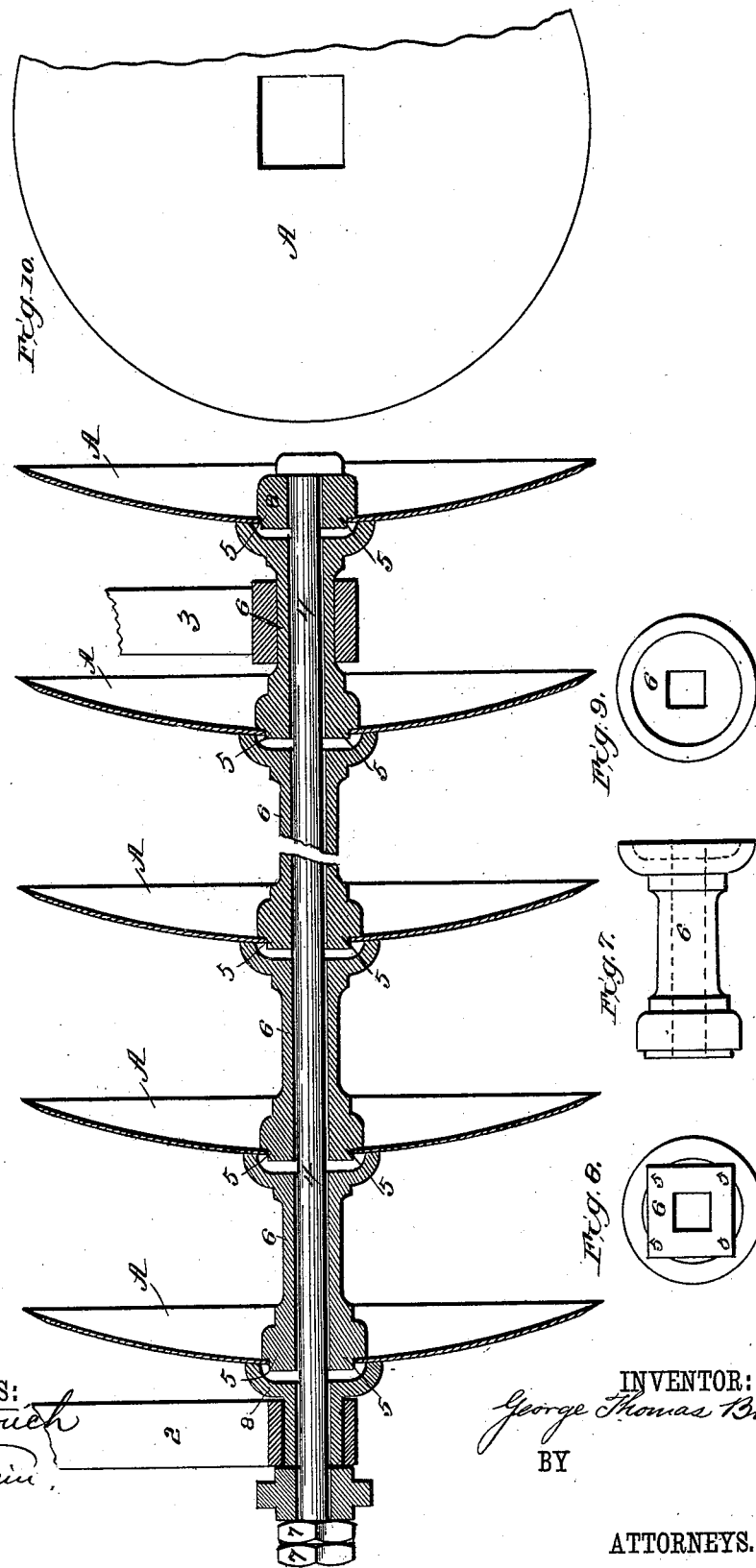
WITNESSES:  
Fred G. Dieterich  
P. B. Turpin
INVENTOR:  
George Thomas Booth  
BY
ATTORNEYS.

UNITED STATES PATENT OFFICE.

GEORGE THOMAS BOOTH, OF CHRISTCHURCH, NEW ZEALAND.

DISK HARROW.

SPECIFICATION forming part of Letters Patent No. 405,005, dated June 11, 1889.

Application filed March 24, 1888. Serial No. 268,450. (No model.) Patented in New Zealand December 5, 1885, No. 1,645, and in New South Wales August 29, 1887, No. 149.

*To all whom it may concern:*

Be it known that I, GEORGE THOMAS BOOTH, agricultural engineer, a British subject, residing at Christchurch, in the Provincial District of Canterbury, in the Colony of New Zealand, have invented a new and useful Disk Harrow, (for which I have obtained patents in the Colony of New Zealand, No. 1,645, dated the 5th day of December, 1885, and in the Colony of New South Wales, dated the 29th day of August, 1887, and numbered 149,) of which the following is a specification.

My invention relates to improvements in disk harrows; and the objects of my improvements are, first, to secure the disks more firmly on the bolt or axle, so as to prevent excessive wear and tear of the holes in the disks and the axis on which the disks are supported; second, more easily to regulate the pressure of the disks on the soil, and so that the pressure may be transferred to the outer or inner end of the disk-bar as required, and, third, to provide wheels and axle, so that the disks may be supported and carried well clear of the ground while traveling. I attain these objects by the mechanism illustrated in the accompanying drawings, in which—

Figure 1:
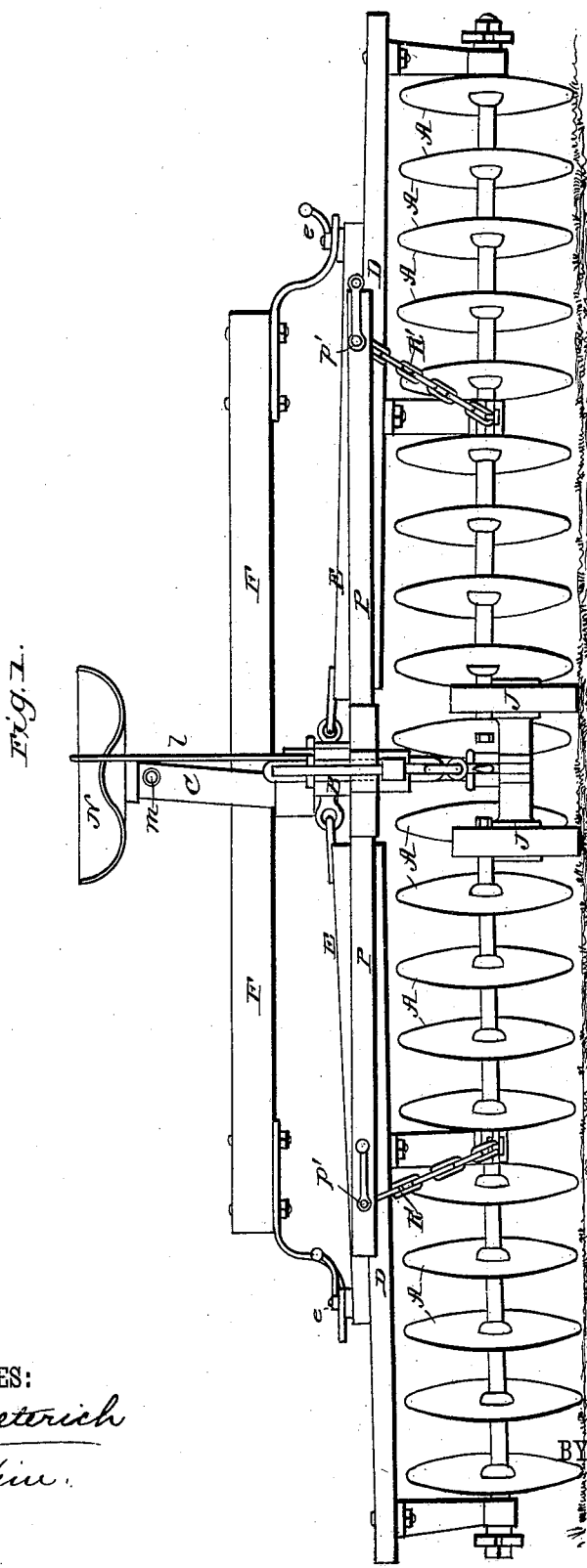
Figure 2:
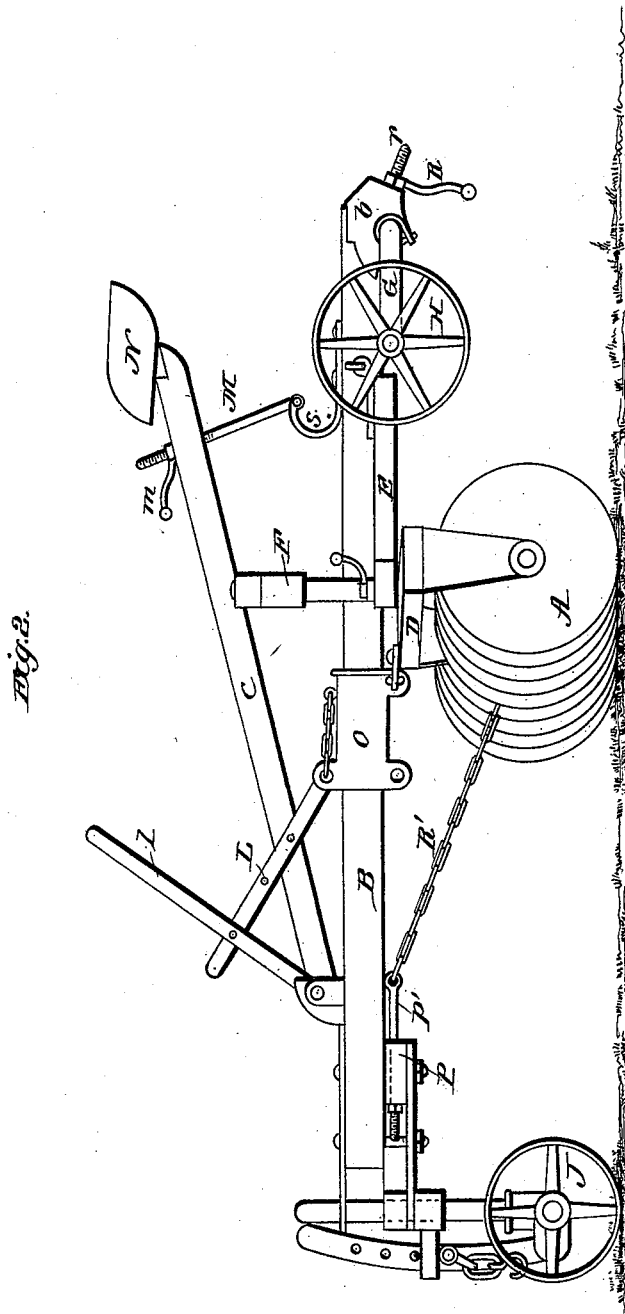
Figure 3:
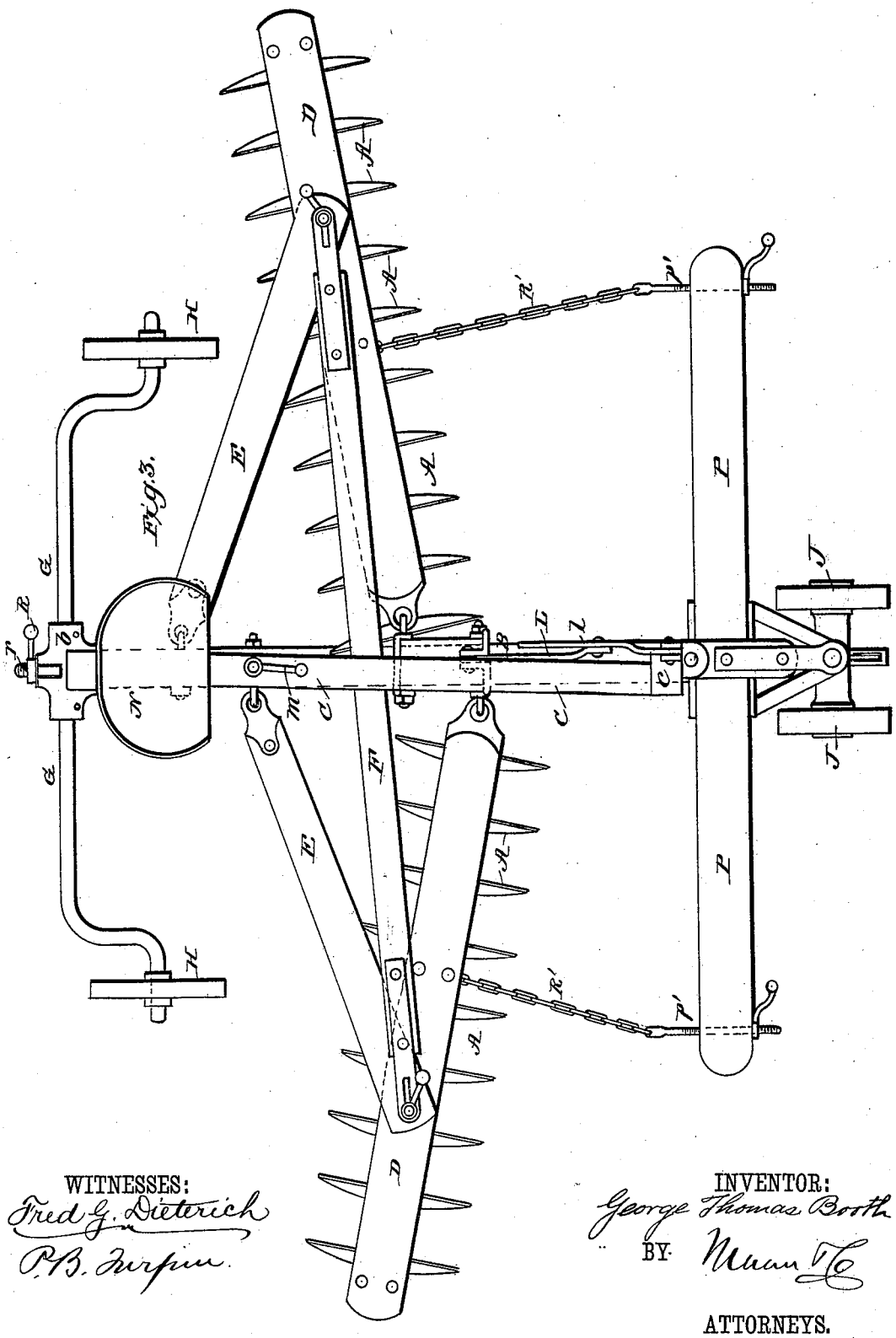
Figure 4:
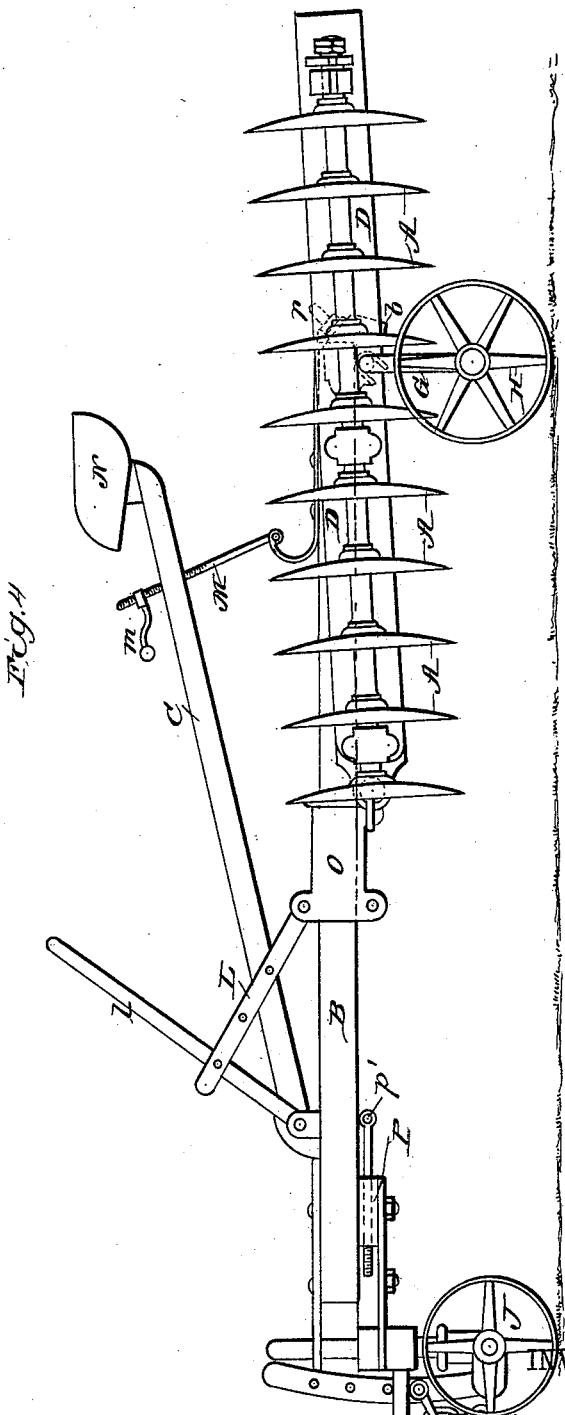

Figure 1 is a front elevation of the machine. Fig. 2 is a side elevation of the same. Fig. 3 is a top view of the same. Fig. 4 is a side view showing the disks as raised up for traveling. Fig. 5 is a top view of the same. Fig. 6 is a section through the disks, showing the improved arrangement of fixing the disks on the axles. Fig. 7 is an elevation of one of the distance pieces or sleeves. Fig. 8 is an end view of the same. Fig. 9 is a view of the other end of the same. Fig. 10 shows one of the disks with the square hole in the same.

Similar letters refer to similar parts throughout the several views.

A A are the disks, which are similar to those of an ordinary disk harrow, but made with a square or other suitably-shaped hole in the center. (See Fig. 10.)

6 6 are the distance pieces or sleeves, to maintain the disks at the proper distance apart.

4 is a bolt passed completely through the distance-pieces, disks, and washers 8 8, and which, when tightened up by the lock-nuts 7 7, binds the whole together, squeezing the disks between the distance-pieces and holding them firmly on the projections 5 5 5 5 of the said distance-pieces, which are formed so as to fit the hole in the center of the disks, Fig. 10, thus forming a strong trussed axle journaled in bearings in supports 2 and 3, the jar and wear and tear of which are removed to the distance pieces or sleeves, relieving the axle or bolt from the wear and tear usual in ordinary disk harrows.

The pole C, to which the seat N is attached, I support on a step or hinge $c$ at its inner end and near the middle on a cross-bar F, which bears upon the outer ends of the disk-bars D D, and a screw-bolt M is supported on a spring S, fixed to the main pole B, which screw-bolt passes through the pole C. A nut-handle $m$ screws down on top of the pole C, by screwing down which the cross-bar F will be depressed, and consequently the outer ends of the disk-frame D, and by this means the outer disks will be depressed and the inner disks raised, which enables the gang of disks to be made to suit irregular ground or to cut deeper at the outside, and vice versa. The disks also will remain in the same position whether a heavy man or a boy be in the seat; or even should he choose to dismount and walk the position of the disks to the soil is still maintained as before.

H H are traveling wheels fitted into a cranked axle G. This cranked axle is supported in an axle-box $b$, which is fastened to the outer extremity of the pole B. The center of the said axle has on it a short square, onto which a corresponding square hole in the bolt $r$ fits, and by which means the axle can be firmly fastened by the handle-nut R, either in the position as shown in Fig. 2, in which case the machine is ready for working, or in the position shown in Figs. 4 and 5, where the machine is ready for traveling. The gangs of disks are turned back and placed over the axle C, as shown also in Figs. 4 and 5.

I is a lever for regulating the angle of the gangs of disks with the pole B by being attached by part L to the sleeve O, which slides on the pole B and carries the inner ends of the disk-bar D forward or backward, as required.

*e e* are screws to hold the gangs of disks at the angles required by tightening together the cross-bar F, the radial bars E E, and the disk-bars D D.

J J are traveling wheels to carry the forward end of the machine, and on which the frame can be raised or lowered.

The bars D are connected by chains R' with a front bar P, the said chains being attached at *p'* to the front bar P, as shown.

What I claim as my invention, and desire to secure by Letters Patent, is—

1. The combination, in a disk harrow, of the framing having a box *b*, the cranked axle G, journaled at its center in box *b* and having at such point a squared portion, the bolt *r*, having a squared opening receiving the squared portion of the axle, and the nut on bolt *r*, substantially as set forth.

2. The combination, in a disk harrow, of the hinged pole C, the screw-bolt M, the handle-nut *m*, the cross-bar F, and the disk-bars D D, with or without a spring S, as described herein, and illustrated in the accompanying drawings.

3. The combination, in a disk harrow, of the axle G, the traveling wheels H, the axle-box *b*, and the screw-bolt *r*, as described herein, and illustrated in the accompanying drawings.

4. In a disk harrow, the combination of the framing and wheels forming the carriage, and the disk bars or frames hinged at their inner ends to the carriage at a point in advance of the wheels, and braces for sustaining the disk-bars in operative position, such disk-bars when not in use being adjustable on their hinge-connections, whereby they may be set out of operative position and supported on the carriage, substantially as set forth.

5. The combination, with the framing and wheels forming a carriage, of the disk-bars having a swivel-connection with said framing, whereby such bars may be set to different working angles and may be lifted at their outer ends and adjusted onto the carriage, substantially as set forth.

6. The combination of the carriage-frame, the disk-bars D, connected at their inner ends adjustably with said frame, the bar F, extended over the carriage-frame and engaged at its outer end with the disk-bars, and the seat-bar connected at its lower end adjustably with the carriage-frame and bearing upon the said bar F, substantially as set forth.

GEORGE THOMAS BOOTH.

Witnesses:
JOHN DEWSBURY,
F. W. DEWSBURY.